United States Patent
Bartlett et al.

(10) Patent No.: US 12,071,089 B2
(45) Date of Patent: Aug. 27, 2024

(54) PASSIVE PEDESTRIAN PROTECTION SYSTEM UTILIZING INPUTS FROM ACTIVE SAFETY SYSTEM

(71) Applicant: ZF FRIEDRICHSHAFEN AG, Friedrichshafen (DE)

(72) Inventors: Charles A. Bartlett, Commerce Township, MI (US); Pawel Koziel, Czestochowa (PL); Michal Duchowski, Czestochowa (PL); Kiran Balasubramanian, Canton, MI (US); Kyeora Lee, Seoul (KR)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 233 days.

(21) Appl. No.: 17/791,046

(22) PCT Filed: Jan. 17, 2020

(86) PCT No.: PCT/US2020/014003
§ 371 (c)(1),
(2) Date: Jul. 6, 2022

(87) PCT Pub. No.: WO2021/145884
PCT Pub. Date: Jul. 22, 2021

(65) Prior Publication Data
US 2023/0032994 A1 Feb. 2, 2023

(51) Int. Cl.
*B60R 21/0134* (2006.01)
*B60R 21/36* (2011.01)
*B60R 21/38* (2011.01)

(52) U.S. Cl.
CPC .......... *B60R 21/0134* (2013.01); *B60R 21/36* (2013.01); *B60R 21/38* (2013.01)

(58) Field of Classification Search
CPC ..... B60R 21/0134; B60R 21/36; B60R 21/38; B60R 21/01332
USPC ....................................... 701/45–47
See application file for complete search history.

(56) References Cited

U.S. PATENT DOCUMENTS

| | | | |
|---|---|---|---|
| 6,561,301 B1 | 5/2003 | Hattori et al. | |
| 9,889,808 B2* | 2/2018 | Lang ................. | B60R 21/0136 |
| 2004/0007859 A1 | 1/2004 | Shields et al. | |
| 2006/0212201 A1 | 9/2006 | Takahashi et al. | |
| 2008/0046150 A1 | 2/2008 | Breed | |
| 2009/0312949 A1* | 12/2009 | Suzuki ............... | B60R 21/0136 |
| | | | 701/301 |
| 2010/0042296 A1* | 2/2010 | Brandmeier ........ | B60R 21/0136 |
| | | | 701/46 |
| 2011/0043344 A1* | 2/2011 | Nichols ............... | B60R 21/0136 |
| | | | 340/436 |
| 2015/0314744 A1 | 11/2015 | Lang et al. | |

FOREIGN PATENT DOCUMENTS

KR 20120140545 A 12/2012

* cited by examiner

*Primary Examiner* — Hai H Huynh
(74) *Attorney, Agent, or Firm* — ROSSI, KIMMS & McDOWELL LLP (57) ABSTRACT

A vehicle safety system for helping to protect a pedestrian in the event of a vehicle frontal collision with the pedestrian includes a plurality of crash sensors for sensing a vehicle frontal collision, an actuatable pedestrian protection device, a controller for controlling actuation of the pedestrian protection device, and at least one active sensor for determining the presence of a pedestrian in the path of the vehicle.

24 Claims, 7 Drawing Sheets

PASSIVE PEDESTRIAN PROTECTION SYSTEM UTILIZING INPUTS FROM ACTIVE SAFETY SYSTEM

CROSS REFERENCES TO RELATED APPLICATIONS

This application filed under 35 U.S.C § 371 is a national phase application of International Application Serial Number PCT/US2020/014003, filed Jan. 17, 2020, the subject matter of which are incorporated herein by reference in its entirety.

BACKGROUND

Modern vehicles include various systems for helping to provide occupant safety. For example, it is known to provide a vehicle safety system that includes one or more passive restraints, such as airbags and seatbelt retractors, that are actuatable to help protect an occupant of a vehicle. These vehicle safety systems utilize an airbag control unit that is operatively connected to the airbags and to a variety of crash sensors, such as accelerometers and pressure sensors. In response to determining a crash scenario based on information provided by the crash sensors, the airbag control unit is operative to deploy the airbags by activating an inflator that directs inflation fluid into the airbags. When inflated, the driver and passenger airbags help protect the occupant from impacts with parts of the vehicle such as the instrument panel and/or a steering wheel of the vehicle.

Active safety systems utilize sensing devices, such as cameras, radar, lidar, and ultrasonic transducers to determine the conditions around the vehicle. In response to the sensed conditions, vehicle warning systems can provide visual, audible, tactile warnings to the driver. This can be the case, for example, with blind-spot detection, lane departure, front/rear object detection, cross traffic detection, pedestrian detection. Active safety systems can also use the sensed conditions to actively actuate vehicle controls, such as active cruise control, active braking, active steering in response to lane departure detection, etc. The sensing devices utilized in active safety systems each have advantages.

Cameras are very effective at object detection. When arranged to view from several angles, cameras supply the vehicle with information that can be used by artificial intelligence algorithms of vehicle safety systems to detect external objects, such as other vehicles, pedestrians, or objects, such as trees or garbage cans, along the side of the road. Cameras can measure angles precisely, which allows the vehicle safety system to recognize early on whether an approaching object will come into the vehicle's path. Utilizing both long and short range zoom in combination with varying degrees of wide and narrow fields of vision, cameras become important tools for safety features such as collision avoidance, adaptive cruise control, automated braking systems, and the lane keeping assist functions.

Radar sensors use an echo system to detect objects, which is beneficial in case of poor visibility, which can detract from the camera's effectiveness. Radar sensors emit electromagnetic waves and receive the "echo" that is reflected back from the surrounding objects. Radar sensors are especially effective in determining the distance and the speed of objects, such as vehicles and pedestrians, relative to the vehicle. Functioning regardless of weather, light or visibility conditions, radar sensors are ideal for maintaining distances, issuing collision warnings, blind-spot detection, emergency braking, etc.

Lidar sensors also apply the echo principle, using laser pulses instead of radio waves. Lidar sensors record distances and relative speeds with an accuracy on par with radar. Additionally, lidar sensors can also recognize object types and angles between objects with a much higher level of accuracy. Lidar sensors can therefore be utilized to recognize more complex traffic situations very well, even in the dark. Unlike cameras and radar sensors, the angle of view is not critical because lidar sensors can record the 360-degree environment of the vehicle. The high-resolution 3D solid state lidar sensors can even render pedestrians and smaller objects three dimensionally.

SUMMARY

The invention relates to a vehicle safety system that includes both active and passive components. In this description, "active safety" is used to refer to technology assisting in the prevention of a crash, i.e., "crash avoidance," and "passive safety" is used to refer to components of the vehicle, such as airbags, seatbelts, and the physical structure of the vehicle (e.g., crumple zones) that help to protect occupants during a crash.

Passive safety systems include one or more sensors, such as accelerometers and/or pressure sensors, that are configured to sense the occurrence of a crash event. A controller is configured to receive signals from the sensors, determine or discriminate the occurrence of a collision based on the signals, and to deploy one or more actuatable restraints, such as airbags and/or seatbelt pretensioners/retractors, in response to the sensed collision.

Active safety systems, such as crash avoidance systems, are designed to prevent or reduce the severity of a vehicle crash by using radar (all-weather), laser (LIDAR), camera (employing image recognition), or a combination thereof, to detect an imminent crash. In response to detecting an imminent crash, crash avoidance systems can produce operator warnings (visual, audible, tactile) and can also actuate active safety measures, such as automatic emergency braking and/or automatic emergency steering to help avoid or mitigate the crash.

For example, a crash avoidance system can implement automatic emergency braking to detect a potential forward collision and activate the vehicle braking system to decelerate the vehicle with the purpose of avoiding or mitigating a collision. Once an impending collision is detected, the crash avoidance system provides a warning to the driver. When the collision becomes imminent, the crash avoidance system takes action automatically and autonomously, without any driver input, by applying emergency braking.

The active safety system can be a standalone system or can be a subsystem utilizing components of another system, such as a driver assist system (DAS), which utilized the camera, radar, LIDAR data to provide driver assistance functions, such as active cruise control, lane departure, blind spot monitoring, parking assist, etc. These components can even be used to provide automated driving capabilities.

According to the invention, information obtained from an active safety system is used to enhance the crash discrimination performed by the passive safety system in order to improve the responsiveness of the vehicle safety system.

According to one aspect, a vehicle safety system for helping to protect a pedestrian in the event of a vehicle frontal collision with the pedestrian includes a plurality of crash sensors for sensing a vehicle frontal collision, an actuatable pedestrian protection device, a controller for controlling actuation of the pedestrian protection device, and at least one active sensor for determining the presence of a pedestrian in the path of the vehicle. The controller is operative to determine the occurrence of a collision with a pedestrian in response to signals received from the crash sensors. The controller is configured to determine the occurrence of a collision with a pedestrian using normal crash discrimination metrics implementing normal thresholds for determining whether signals received from the crash sensors indicate the occurrence of a collision with the pedestrian. In response to determining the presence of a pedestrian in the path of the vehicle using the active sensor, the controller is configured to determine the occurrence of a collision with a pedestrian using hybrid crash discrimination metrics implementing hybrid thresholds, lower than the normal thresholds, for determining whether signals received from the crash sensors indicate the occurrence of a collision with the pedestrian.

According to another aspect, alone or in combination with any other aspect, the controller can be configured to evaluate the normal crash discrimination metrics with a first crash sensor to determine the occurrence of a collision with the pedestrian and to evaluate normal safing metrics with a second crash sensor, different than the first crash sensor, to verify the determination of the first sensor. The controller can also be configured to evaluate the hybrid crash discrimination metrics with a first crash sensor to determine the occurrence of a collision with the pedestrian and to evaluate hybrid safing metrics with a second crash sensor, different than the first crash sensor, to verify the determination of the first sensor.

According to another aspect, the first and second crash sensors can include first and second accelerometers. Additionally, the normal and hybrid crash discrimination metrics can include acceleration crash discrimination metrics that are evaluated to determine whether acceleration signals received from the first accelerometer exceed a predetermined discrimination threshold determined with respect to a high pass filtered (HPF) acceleration signal received from the first accelerometer. Furthermore, the normal and hybrid safing metrics can include acceleration safing metrics that are evaluated to determine whether acceleration signals received from the second accelerometer exceed a predetermined safing threshold determined with respect to a high pass filtered (HPF) acceleration signal received from the second accelerometer.

According to another aspect, the first and second crash sensors can include first and second pressure sensors of a pressure tube sensor. Additionally, the normal and hybrid crash discrimination metrics can include pressure crash discrimination metrics that are evaluated to determine whether pressure signals received from the first pressure sensor exceed a predetermined discrimination threshold determined with respect to a high pass filtered (HPF) acceleration signal received from the first pressure sensor. Furthermore, the normal and hybrid safing metrics can include pressure safing metrics that are evaluated to determine whether pressure signals received from the second pressure sensor exceed a predetermined safing threshold determined with respect to a high pass filtered (HPF) acceleration signal received from the first pressure sensor.

According to another aspect, alone or in combination with any other aspect, the controller can be configured to determine the occurrence of a collision with a pedestrian using at least one of the following crash determination metric combinations:

a normal acceleration crash discrimination metric that determines the occurrence of a collision with a pedestrian based on sensed acceleration values, and a normal acceleration safing metric that verifies the determination using sensed acceleration values different from those used by the normal acceleration crash discrimination metric;

a hybrid acceleration crash discrimination metric that determines the occurrence of a collision with a pedestrian based on sensed acceleration values, and a hybrid acceleration safing metric that verifies the determination using sensed acceleration values different from those used by the normal acceleration crash discrimination metric;

a normal pressure crash discrimination metric that determines the occurrence of a collision with a pedestrian based on sensed pressure values, and a normal pressure safing metric that verifies the determination using sensed pressure values different from those used by the normal pressure crash discrimination metric; and a hybrid pressure crash discrimination metric that determines the occurrence of a collision with a pedestrian based on sensed pressure values, and a hybrid pressure safing metric that verifies the determination using sensed pressure values different from those used by the normal pressure crash discrimination metric.

According to another aspect, alone or in combination with any other aspect, the controller can be configured to implement a robustness algorithm that determines, based on information from the active sensor, whether to implement a standard pedestrian protection scheme, a sensitive pedestrian protection scheme, and a robust pedestrian protection scheme. The robustness algorithm can be configured to implement the standard pedestrian protection scheme in response to detecting via the active sensor any one of the following:

no information on the presence of a pedestrian in the path of the vehicle;

the presence of a pedestrian in the path of the vehicle and an impact with the pedestrian is not imminent; and the presence of a vehicle/object other than a pedestrian in the path of the vehicle and an impact with the vehicle/object is not imminent.

According to this aspect, in response to implementing the standard pedestrian protection scheme, the controller can be to deploy the pedestrian protection device in response to at least one of:

the normal acceleration crash discrimination metric determines the occurrence of a collision with a pedestrian and the normal acceleration safing metric verifies the collision;

the normal pressure crash discrimination metric determines the occurrence of a collision with a pedestrian and the normal pressure safing metric verifies the collision; and the hybrid acceleration crash discrimination metric determines the occurrence of a collision with a pedestrian, the hybrid acceleration safing metric verifies the collision, the hybrid pressure crash discrimination metric determines the occurrence of a collision with a pedestrian, and the hybrid pressure safing metric verifies the collision.

According to another aspect, the robustness algorithm can be configured to implement a sensitive pedestrian protection scheme in response to detecting via the active sensor the presence of a pedestrian in the path of the vehicle and that an impact with the pedestrian is imminent. In response to implementing the sensitive pedestrian protection scheme, the controller can be configured to deploy the pedestrian protection device in response to at least one of:

the normal acceleration crash discrimination metric determines the occurrence of a collision with a pedestrian and the normal acceleration safing metric verifies the collision;

the normal pressure crash discrimination metric determines the occurrence of a collision with a pedestrian and the normal pressure safing metric verifies the collision;

the hybrid acceleration crash discrimination metric determines the occurrence of a collision with a pedestrian, the hybrid acceleration safing metric verifies the collision; and the hybrid pressure crash discrimination metric determines the occurrence of a collision with a pedestrian, the hybrid pressure safing metric verifies the collision.

According to another aspect, the robustness algorithm can be configured to implement a robust pedestrian protection scheme in response to detecting via the active sensor the presence of a vehicle/object other than a pedestrian in the path of the vehicle and that an impact with the vehicle/object is imminent. In response to implementing the robust pedestrian protection scheme, the controller is configured to deploy the pedestrian protection device in response to at least one of:

the normal acceleration crash discrimination metric determines the occurrence of a collision with a pedestrian and the normal acceleration safing metric verifies the collision; and the normal pressure crash discrimination metric determines the occurrence of a collision with a pedestrian and the normal pressure safing metric verifies the collision.

According to another aspect, alone or in combination with any other aspect, the controller can be configured to determine via the active sensor:

a type of the object in the vehicle path;
a lateral position of the object relative to the vehicle path;
a time to collision (TTC) of the object in the vehicle path;
a relative velocity of the object and the vehicle;
a longitudinal position of the object relative to the vehicle; and
a vehicle speed of the vehicle.

According to this aspect, the controller can be configured to implement an algorithm for detecting the presence of an object in the path of the vehicle by:

determining whether the type of the object in the vehicle path is a pedestrian or another vehicle/object;
determining whether the lateral position of the object is within a threshold range of lateral position values;
determining whether the TTC with the object is within a threshold indicative of an impending collision;
determining whether longitudinal position of the object is within a threshold indicative of an impending collision;
determining whether the vehicle speed is within a threshold range of vehicle speed values a speed of the vehicle.

According to this aspect, the controller can be configured to evaluate a TTC collision discrimination metric to determine whether the TTC exceeds a predetermined threshold indicative of an impending collision, wherein the threshold is determined with respect to the relative velocity of the object and the vehicle. Additionally, the controller can be configured to evaluate a longitudinal distance collision discrimination metric to determine whether the longitudinal distance between the object and the vehicle exceeds a predetermined threshold indicative of an impending collision, wherein the threshold is determined with respect to the relative velocity of the object and the vehicle.

According to another aspect, alone or in combination with any other aspect, the controller can be configured to implement an algorithm for determining the presence of a pedestrian in the path of the vehicle by:

determining a time to collision (TTC) with the of the pedestrian in the vehicle path and a relative velocity of the pedestrian and the vehicle; and
determining whether the TTC with the pedestrian is within a threshold indicative of an impending collision by evaluating a TTC collision discrimination metric to determine whether the TTC exceeds a predetermined threshold, the threshold being determined with respect to the relative velocity of the pedestrian and the vehicle.

According to another aspect, alone or in combination with any other aspect, the controller can be configured to implement an algorithm for determining the presence of a pedestrian in the path of the vehicle by:

determining a longitudinal position of the pedestrian relative to the vehicle, and a relative velocity of the pedestrian and the vehicle; and
determining whether the longitudinal position of the pedestrian relative to the vehicle is within a threshold indicative of an impending collision by evaluating a longitudinal distance collision discrimination metric to determine whether the longitudinal distance between the pedestrian and the vehicle exceeds a predetermined threshold, the threshold being determined with respect to the relative velocity of the pedestrian and the vehicle.

According to another aspect, alone or in combination with any other aspect, the at least one active sensor can include at least one of a camera, a radar sensor, and a laser radar (LIDAR) sensor.

According to another aspect, alone or in combination with any other aspect, the vehicle safety system can include an active safety system, wherein the active sensor is a component of the active safety system. According to this aspect, the active safety system can be configured to perform driver assist functions comprising at least one of active cruise control functions, lane departure functions, blind spot monitoring functions, parking assist functions, automated driving functions. Additionally, the active safety system can include a DAS controller for controlling the driver assist functions, wherein the DAS controller is configured to communicate with the passive safety system controller. Furthermore, the vehicle safety system can include a passive safety system comprising the crash sensors, the pedestrian protection device, and the controller, wherein the controller comprises an airbag controller unit (ACU).

According to another aspect, alone or in combination with any other aspect, the pedestrian protection device comprises at least one of a hood lifter and a pedestrian airbag.

DESCRIPTION

In this description, reference is sometimes made to the left and right sides of a vehicle. These references should be understood as being taken with reference to the forward direction of vehicle travel. Thus, reference to the "left" side of a vehicle is meant to correspond to a driver side ("DS") of the vehicle. Reference to the "right" side of the vehicle is meant to correspond to a passenger side ("PS") of the vehicle.

Also, in this description, certain descriptions are made with respect to vehicle axes, specifically, the X-axis, Y-axis, and Z-axis of the vehicle. The X-axis is a central, longitudinally extending axis of the vehicle. The Y-axis is a laterally extending axis of the vehicle that is perpendicular to the X-axis. The Z-axis is a vertically extending axis of the vehicle that is perpendicular to both the X-axis and Y-axis. The X-axis, Y-axis, and Z-axis intersect at or approximate to a center of gravity ("COG") of the vehicle.

Figure 1:
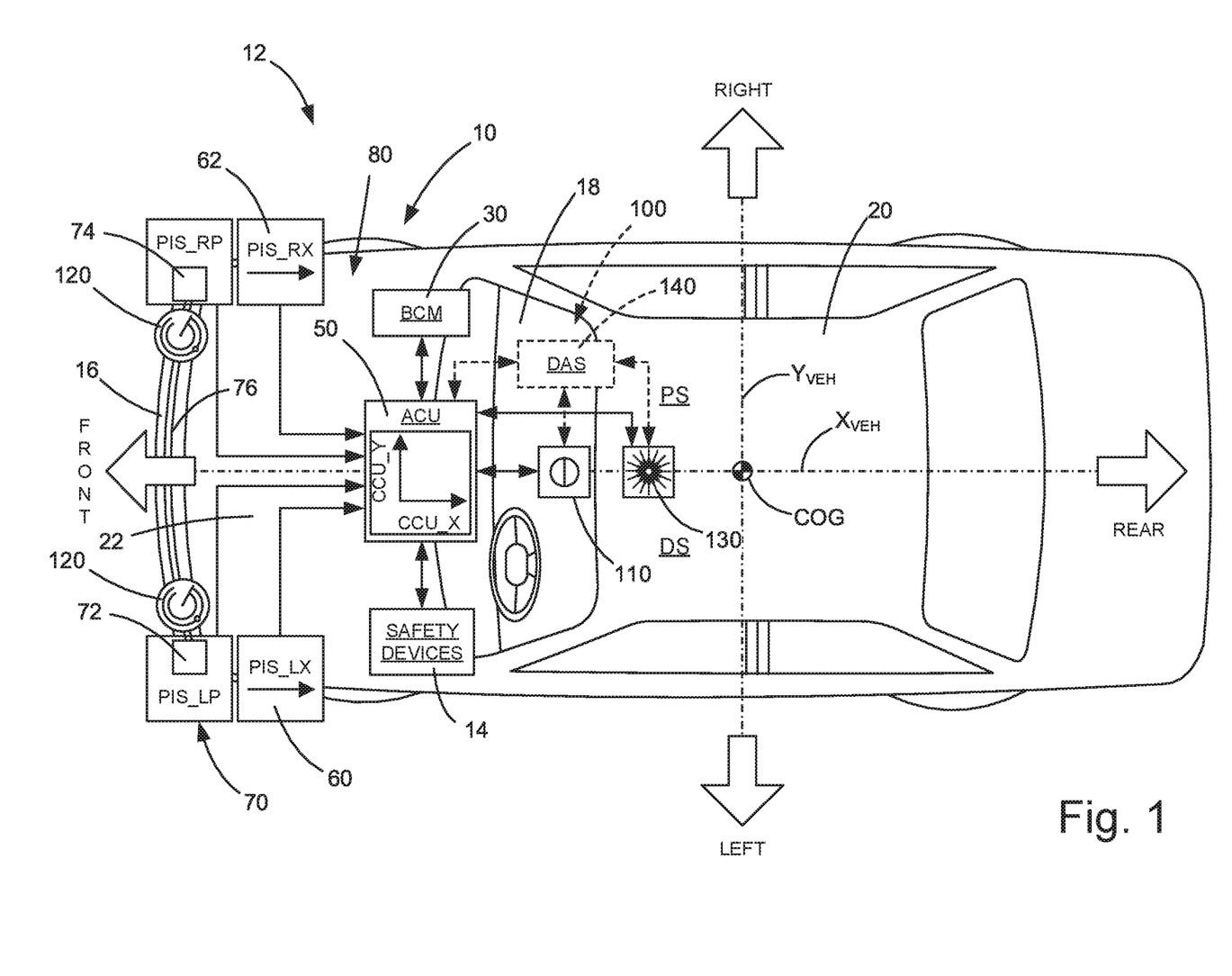
FIG. 1 is a schematic illustration of a vehicle including a vehicle safety system, according to one example configuration.

Referring to FIG. 1, by way of example, a vehicle 12 includes a vehicle safety system 10. The vehicle safety system 10 includes one or more passive safety components in the form of actuatable vehicle occupant protection devices, which are illustrated schematically at 14. The protection devices 14 can include any actuatable vehicle occupant protection device, such as frontal airbags, side airbags, curtain air bags, knee bolster air bags, actuatable seatbelt pretensioners and/or retractors. The protection devices 14 can also include pedestrian protection devices, such as pedestrian airbags inflatable outside the vehicle 12 (e.g., from the front bumper or hood), or hood lifters that are actuatable to lift the vehicle hood 22, which allows the hood to more effectively act as a crumple zone for absorbing the pedestrian impact in order to help minimize or reduce the risk of injury.

The vehicle safety system 10 also includes an airbag electronic control unit (referred to herein as an airbag controller unit or "ACU") 50 that is operatively connected to the protection devices 14. The ACU 50 is operative to control the actuation of the protection devices 14 in response to vehicle conditions sensed via one or more sensors to which the ACU is operatively connected.

The vehicle safety system 10 includes several sensors, such as accelerometers and/or pressure sensors, for measuring certain conditions of the vehicle 12 that are utilized to determine whether to actuate the vehicle occupant protection devices 14. These sensors can be mounted at various locations throughout the vehicle 12 selected to allow for sensing the particular vehicle condition for which the sensor is intended. In this description, the vehicle safety system 10 is described as including several crash sensors of different types and locations in the vehicle 12. The crash sensors described herein are not necessarily a complete list of sensors included in the vehicle safety system 10. The sensors described herein are only those utilized by the invention. Those skilled in the art will therefore appreciate that the vehicle safety system 100 can include one or more other crash sensor of any type, in any number, and in any location in the vehicle 12.

The vehicle safety system 10 illustrated in FIG. 1 includes a passive safety system 80 implemented in the ACU 50 and utilized to detect the occurrence of a frontal vehicle impact with a pedestrian. For this purpose, in the example configuration of FIG. 1, the vehicle safety system 10 includes a left pedestrian impact sensor (PIS_LX) 60, a right pedestrian impact sensor (PIS_RX) 62, and a pedestrian protection system (PPS) tube sensor 70. The left and right pedestrian impact sensors 60, 62 are accelerometers configured to sense vehicle accelerations and transmit signals indicative of those accelerations to the ACU 50. Although two pedestrian impact sensors 60, 62 are shown in FIG. 1, the vehicle safety system 10 can include any number of these sensors. For example, the vehicle safety system 10 can include a single pedestrian impact sensor, two sensors (as shown), three sensors, five sensors, etc. The ACU 50 is configured to determine whether the magnitude of the sensed accelerations meets or exceeds a threshold sufficient to indicate that a crash event has taken place and to actuate the safety devices in response to that determination.

In FIG. 1, the pedestrian impact sensors 60, 62 are single axis accelerometers configured to detect accelerations in directions parallel to the longitudinal axis $X_{VEH}$, which are indicated generally by the arrows shown in schematic box representation of the sensors for each device. The left and right pedestrian impact sensors 60, 62 are positioned at or near the left (DS) and right (PS) front corners, respectively, of the vehicle 12. The left and right pedestrian impact sensors 60, 62 can, for example, be mounted behind a front bumper 16 of the vehicle at these front corner locations.

The PPS tube sensor 70 includes a left pressure sensor (PIS_LP) 72 and a right pressure sensor (PIS_RP) 74 connected by a tube 76. The left and right pressure sensors 72, 74 are located in the front vehicle bumper 16 and detect pressure responses to impacts with the bumper 16. The PPS tube sensor 70 has a known configuration in which the tube 76 is positioned between a bumper cross beam and bumper fascia, behind an energy absorbing foam.

In response to an impact with the bumper 16, the fascia and foam, which are flexible/deformable, move toward the cross beam, which is rigid, thereby compressing the tube 76. This compression results in a rapid increase in fluid pressure within the tube 76. This pressure increase is sensed by the left and right pressure sensors 72, 74 which, in response, produce corresponding pressure signals, which are provided to the ACU 50. The ACU 50 is configured to determine whether the magnitude of the sensed pressures meets or exceeds a threshold sufficient to indicate that a crash event has taken place and to actuate the safety devices in response to that determination.

The vehicle safety system 10 is implemented and configured to cooperate with other vehicle systems. The ACU 50 can be operatively connected, for example, via a vehicle controller area network (CAN) bus, to a vehicle body control module (BCM) 30. The BCM 30 can communicate via the CAN bus with other vehicle systems, such as chassis control, stability control, traction/skid control, anti-lock braking (ABS), tire pressure monitoring (TPMS), navigation systems, instrumentation (speed, throttle position, brake pedal position, etc.), information and entertainment ("infotainment") systems, and other systems. Through the CAN bus interface, the ACU 50 can communicate with any of these external systems to provide and/or receive data.

Referring still to FIG. 1, the vehicle safety system 10 also includes an active safety system 100 that includes one or more active safety system components configured to provide crash avoidance functionality. The active safety system 100 can utilize components of a driver assist system (DAS), which, as the name implies, provide assistance to the vehicle operator while driving. These components can help provide DAS functionality, such as such active cruise control, lane departure, blind spot monitoring, parking assist, automated driving, etc. These components can even be used to provide automated driving capabilities. For crash avoidance functionality, the active safety system can provide crash warnings (audible, visual, tactile), automatic emergency braking, and automatic emergency steering.

The components of the active safety system 100 can, for example, include one or more of the following components: cameras, radar sensors, and laser radar (LIDAR) sensors. A camera 110 is mounted in a forward-facing manner high on the windshield 18, e.g., behind or in the area of a rearview mirror. Radar sensor(s) 120 can be front mounted, in the area of the bumper 16, e.g., in the grille. A laser radar (LIDAR) sensor 130 can be mounted on or near the vehicle roof 20.

Cameras 110 are effective in providing a wide field-of-view, with the ability to identify various objects/obstacles with a high degree of accuracy. Cameras can also determine whether an object/obstacle is in the path of the vehicle 12. Cameras also require good visibility and suffer in dark conditions, fog, rain, snow, etc. Radar sensors 120 do not suffer in poor visibility conditions and do provide accurate indications of time-to-collision (TTC). Radar sensors 120 are, however, less capable in terms of discerning between different types of objects/obstacles and are not as adept as cameras in determining whether an object/obstacle is in the path of the vehicle 12. LIDAR sensors 130 provide 3-D sensing capability for TTC and vehicle path determination, provide good object/obstacle recognition, and are robust in both good and poor visibility situations.

The camera 110, radar sensor 120, and LIDAR sensor 130 can be connected to a separate controller, such as a DAS controller 140, and that controller can communicate with the ACU 50 via the CAN bus. Alternatively, both the active and passive safety functionality can be handled by a single controller, such as the ACU 50, in which case, the camera 110, radar sensor 120, and LIDAR sensor 130 can be connected directly to the ACU 50.

FIGS. 2-8 illustrate control algorithms implemented by the vehicle safety system 10 to help protect a pedestrian in the event of an impact with the vehicle 12. The algorithms are implemented in a vehicle controller, which is operatively connected to the safety devices and is configured to actuate the safety devices in response detecting the occurrence of a vehicle collision. More specifically, the vehicle safety system 10 according to the invention is configured to actuate safety devices 14 in response to detecting a vehicle collision with a pedestrian, in particular a collision with a pedestrian at the front end of the vehicle 12 in the area of the front bumper 16. For purposes of this description, the safety devices 14 in this instance therefore can be pedestrian protection devices, such as hood lifters or pedestrian airbags.

Figure 2:
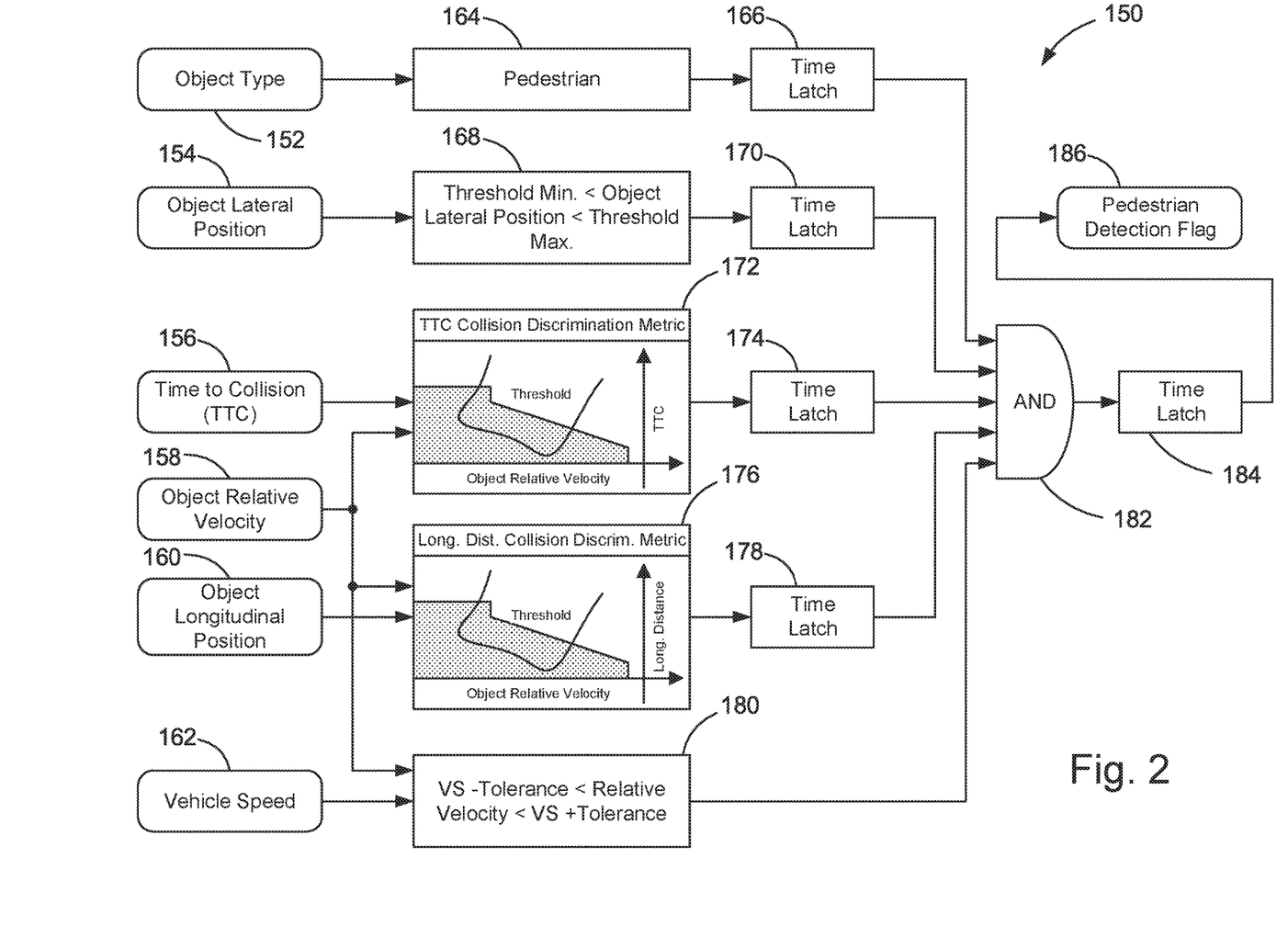
FIG. 2 is a schematic diagram illustrating pedestrian detection via active safety devices of the vehicle safety system.

FIG. 2 illustrates an algorithm 150 for detecting the presence of a pedestrian in the path of the vehicle 12. The pedestrian detection algorithm 150 can be implemented in the passive safety system 80 or the active safety system 100. If implemented in the active safety system 100, the determinations made by the pedestrian detection algorithm 150 can be transmitted to the passive safety system 80, for example, via CAN bus. The pedestrian detection algorithm 150 utilizes one or more of the active safety devices, e.g., camera sensors 110, radar sensors 120, and LIDAR sensors 130 to detect an object in the path of the vehicle 12 and determine data regarding object type 152, object lateral position 154, time to collision (TTC) 156, relative velocity 158, and object longitudinal position 160 (relative to the vehicle 12). The pedestrian detection algorithm 150 also obtains vehicle speed 162, for example, from the BCM 30 via the CAN bus.

The pedestrian detection algorithm 150 produces a pedestrian detected flag 186 in response to ALL of the following conditions being true (see AND gate 182):

Object type 152=pedestrian (block 164).

Object lateral position 154 greater than threshold minimum value and less than threshold maximum value (block 168).

TTC collision discrimination metric indicates an imminent pedestrian collision (metric 172).

Longitudinal distance collision discrimination metric indicates an imminent pedestrian collision (metric 176).

Vehicle-object relative velocity within a vehicle speed tolerance range (block 180).

Note that blocks 164, 168 and metrics 172, 176 are time latched at blocks 166, 170, 174, and 178, respectively. Therefore, once those conditions are satisfied or TRUE, they are time latched TRUE for a predetermined time period, which is seen at AND block 182.

The AND gate 182 receives the time latched values from blocks 166, 170, 174, and 178, as well as the relative velocity tolerance value 180. Once the AND gate 182 is satisfied (TRUE) the pedestrian detection flag 186 is triggered (TRUE). The pedestrian detection flag 186 is time latched at block 184. Therefore, once AND block 182 is satisfied, the pedestrian detection flag 186 is maintained TRUE for a predetermined time period.

Figure 3:
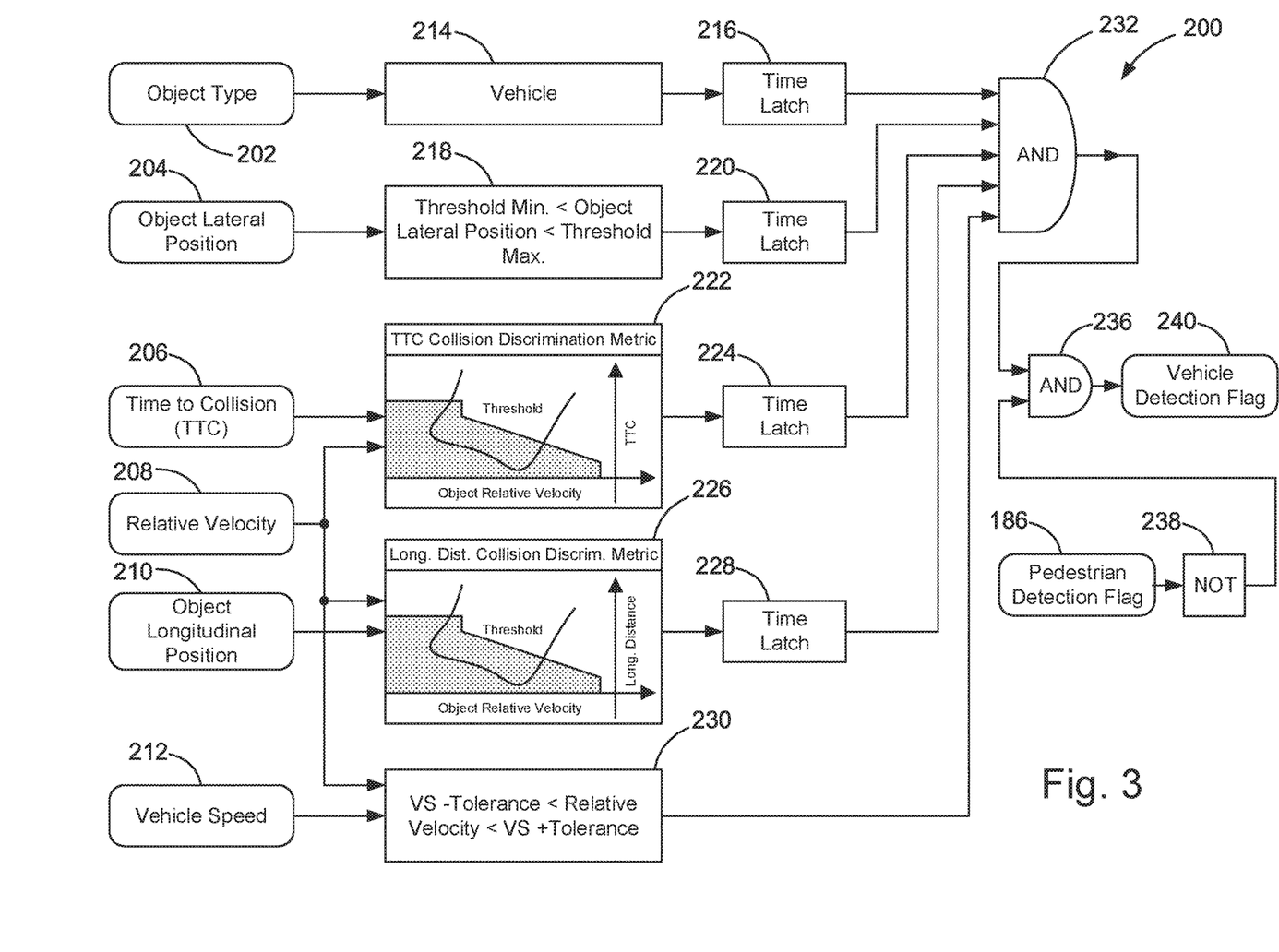
FIG. 3 is a schematic diagram illustrating vehicle/object detection via active safety devices of the vehicle safety system.

FIG. 3 illustrates an algorithm 200 that detects the presence of another vehicle or other objects in the path of the vehicle 12. The vehicle detection algorithm 200 can be implemented in the passive safety system 80 or the active safety system 100. If implemented in the active safety system 100, the determinations made by the vehicle detection algorithm 200 can be transmitted to the passive safety system 80, for example, via CAN bus. The vehicle detection algorithm 200 utilizes one or more the active safety devices, e.g., camera sensors 110, radar sensors 120, and LIDAR sensors 130 to detect an object in the path of the vehicle 12 and determine data regarding object type 202, object lateral position 204, time to collision (TTC) 206, relative velocity 208, and object longitudinal position 210 (relative to the vehicle 12).

The vehicle detection algorithm 200 produces a vehicle detected flag 240 in response to ALL of the following conditions being true (see AND gate 236):

Object type 202=Vehicle or other objects (block 214).

Object lateral position 204 greater than threshold minimum value and less than threshold maximum value (block 218).

TTC collision discrimination metric indicates an imminent pedestrian collision (metric 222).

Longitudinal distance collision discrimination metric indicates an imminent pedestrian collision (metric 226).

Note that blocks 214, 218 and metrics 222, 226 are time latched at blocks 216, 220, 224, and 228, respectively. Therefore, once those conditions are satisfied or TRUE, they are time latched TRUE for a predetermined time period, which is seen at AND block 232.

The AND gate 232 receives the time latched values from blocks 216, 220, 224, and 228. The AND gate 232 is time latched at block 234 and provided to AND block 236. The pedestrian detection flag from FIG. 2 is fed to NOT block 238, which is fed to AND block 236. And block 236 outputs a vehicle detection flag 240, which is indicative of the vehicle detection algorithm 200 producing a vehicle detection indication (block 234) in the absence of the pedestrian detection algorithm 150 producing a pedestrian detection flag 186.

Figure 4:
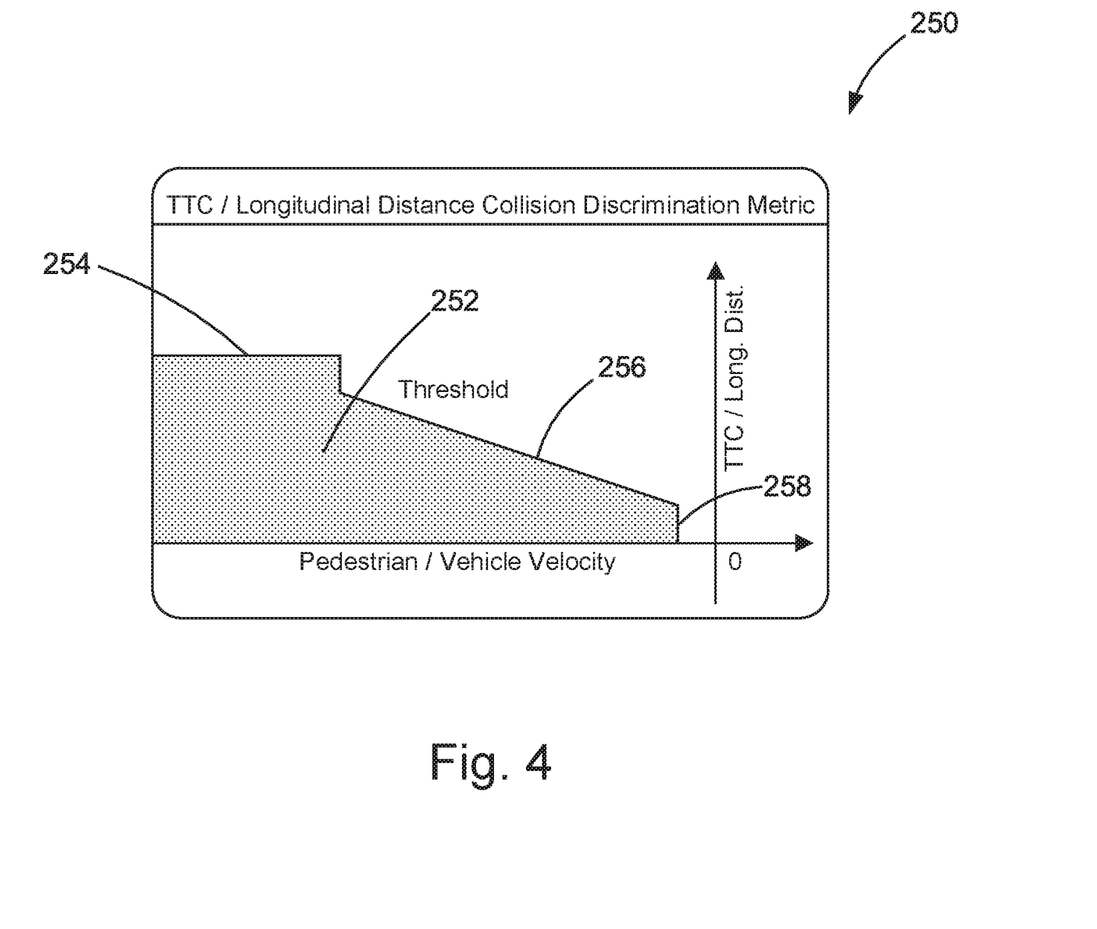
FIG. 4 is a schematic diagram illustrating a crash discrimination metric utilized by the vehicle safety system.

FIG. 4 illustrates an example collision discrimination metric 250 of the type used in the TTC/longitudinal distance collision discrimination metrics of FIGS. 2 and 3, which compare the relative velocity of the detected object to TTC and longitudinal distance, respectively. The purpose of the collision discrimination metric 250 is to determine whether the object, i.e., a vehicle or pedestrian, is within an impact distance of the vehicle and an impact is imminent. If the metric enters the shaded threshold area 252, the object is determined to be within the impact of the vehicle 12, which activates the collision discrimination metric 250, indicating an impending collision with the detected object.

As shown at 254, the collision discrimination metric 250 is activated only below a maximum TTC/longitudinal distance threshold. At 256, the threshold extends at an angle, which can be configured to coincide with or resemble a desired braking profile, i.e., constant deceleration braking to bring the vehicle to a stop within the TTC or longitudinal distance. The constant deceleration value can be platform dependent, for example, through testing to see how long it takes for the vehicle to come to a complete stop given the TTC/longitudinal distance. Braking forces such as 0.5 G, 1.0 G1.5 G, etc. can be used to define the threshold at 256. At 258, a minimum relative velocity can be implemented, for example, based on past experience in PPS no-deploy scenarios. For example, a minimum relative velocity of 18 kph, 15 kph, or less can be implemented.

Figure 5:
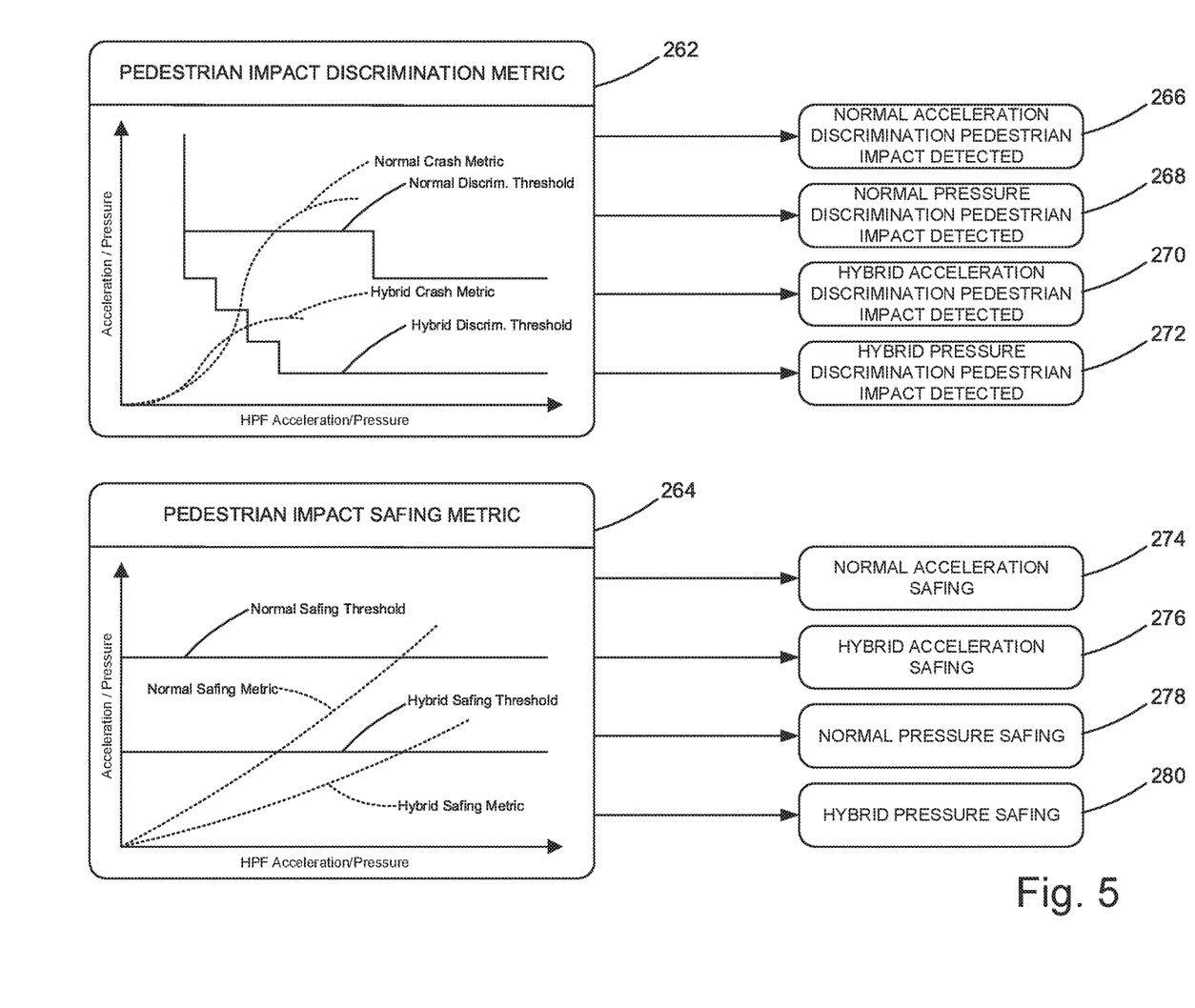
FIG. 5 is a schematic diagram illustrating normal and hybrid crash discrimination utilizing acceleration/pressure sensors.

FIG. 5 illustrates pedestrian impact metrics that are implemented by the passive safety system 80 to detect the occurrence of a vehicle impact with a pedestrian. The pedestrian impact metrics utilize the left pedestrian impact sensor (PIS_LX) 60, right pedestrian impact sensor (PIS_RX) 62, left pedestrian impact pressure sensor (PIS_LP) 72 and right pedestrian impact pressure sensor (PIS_RP) 72 of pedestrian protection system (PPS) tube sensor 70 to discriminate the pedestrian impact based on their sensed accelerations and/or pressures.

As shown in FIG. 5, the pedestrian impact detection algorithm 260 includes a pedestrian impact discrimination metric 262 and a pedestrian impact safing metric 264. These metrics evaluate the acceleration and/or pressure signals from their respective sensors versus a high pass filtered (HPF) version of the signal. These metrics can be similar or identical to those disclosed in U.S. Pat. No. 9,855,915 B2, issued Jan. 2, 2018, which is hereby incorporated by reference in its entirety.

The passive safety system 80 implements two types of discrimination metrics: normal pedestrian impact discrimination metrics and hybrid pedestrian impact detection metrics. The difference between the normal and hybrid metrics lie in the thresholds implemented in those metrics. The hybrid thresholds for both discrimination and safing are lower than the normal thresholds. In both normal and hybrid instances, pedestrian impact discrimination can be on the basis of sensed accelerations via pedestrian impact sensors PIS_LX 60, PIS_RX 62, or on the basis of sensed pressures via pressure sensors PIS_LP 72, PIS_RP 74. For all pedestrian impact discrimination, normal and hybrid, acceleration and pressure, one sensor discriminates the occurrence of the pedestrian impact (i.e., the discrimination metric 262) and another sensor confirms the pedestrian impact (i.e., the safing metric 264).

For example, if one acceleration sensor is used to discriminate the pedestrian impact, whether normal or hybrid, the other acceleration sensor is used to confirm the pedestrian impact. Similarly, if one pressure sensor is used to discriminate the pedestrian impact, whether normal or hybrid, the other pressure sensor is used to confirm the pedestrian impact. It can therefore be seen that, for the example configuration of the passive safety system 80 disclosed herein, which implements two pedestrian impact sensors, there are eight distinct combinations or scenarios for detecting the occurrence of a pedestrian impact and verifying the detected pedestrian impact with safing. These scenarios are shown in the following table:

TABLE 1

| Scenario | Discriminating Sensor | Safing Sensor |
| --- | --- | --- |
| Normal Acceleration 1 | PIS_LX | PIS_RX |
| Normal Acceleration 2 | PIS_RX | PIS_LX |
| Normal Pressure 1 | PIS_LP | PIS_RP |
| Normal Pressure 2 | PIS_RP | PIS_LP |
| Hybrid Acceleration 1 | PIS_LX | PIS_RX |
| Hybrid Acceleration 2 | PIS_RX | PIS_LX |
| Hybrid Pressure 1 | PIS_LP | PIS_RP |
| Hybrid Pressure 2 | PIS_RP | PIS_LP |

Recalling that the vehicle safety system 10 can include any number of pedestrian impact sensors (e.g., one, two, three, five, etc.), it will be appreciated that the number of discriminating/safing sensor combinations will vary accordingly. Also, where the number of pedestrian impact sensors is greater than two, the discrimination and/or safing can be performed using more than one sensor. For purposes of simplicity, when reference is made herein to "a discriminating sensor" or "a sensor for evaluating discriminating metrics," it is meant to refer to one or more such sensors. Similarly, when reference is made herein to "a safing sensor" or "a sensor for evaluating safing metrics," it is meant to refer to one or more such sensors. Furthermore, when reference is made to an acceleration signal received from an acceleration sensor, it is meant to refer to one or more acceleration signals received from one or more acceleration sensors.

Figure 6:
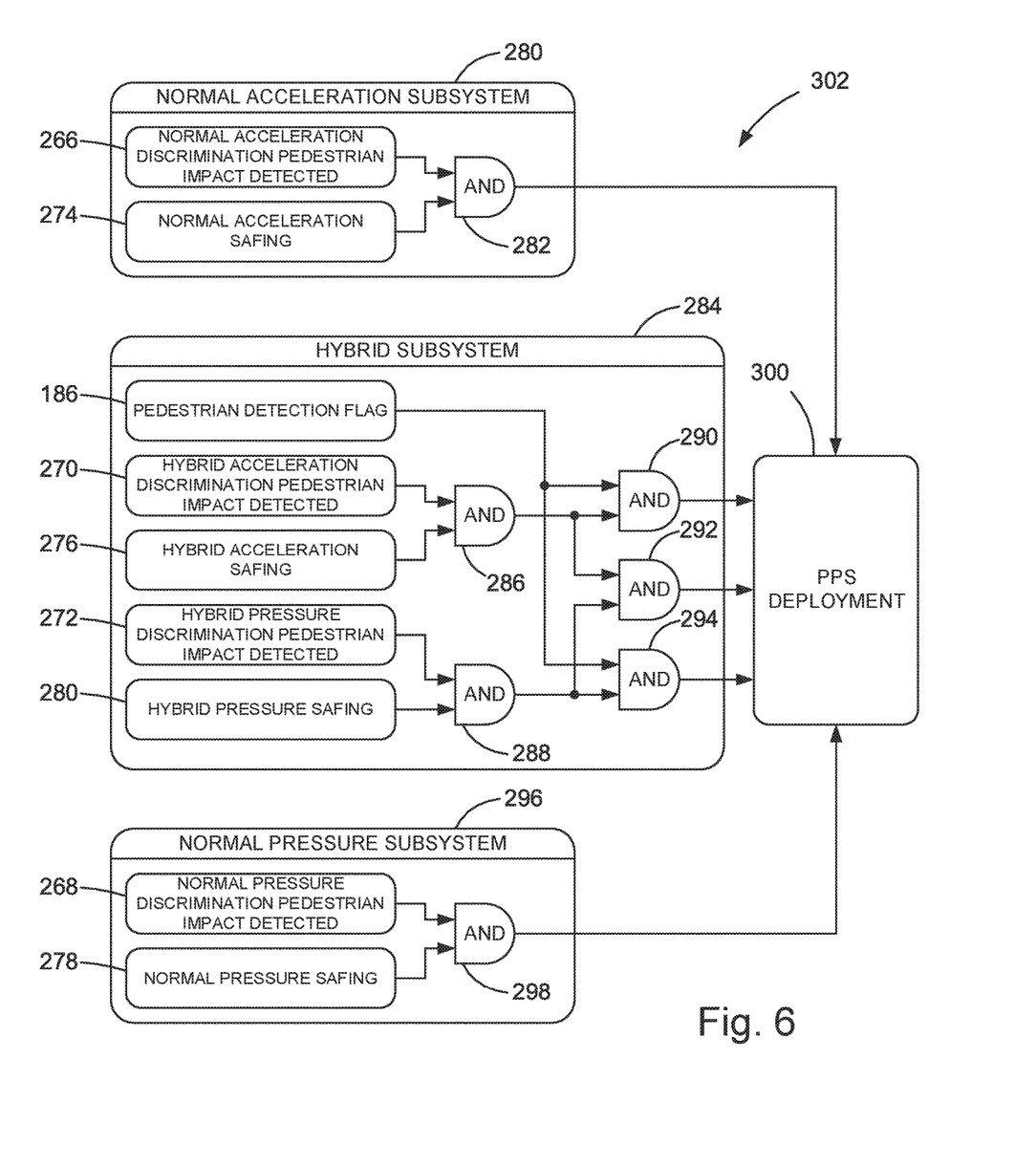
FIG. 6 is a schematic diagram illustrating the vehicle safety system determines whether to deploy a pedestrian protection system.

A pedestrian protection system (PPS) deployment algorithm 302 is illustrated in FIG. 6. The PPS deployment algorithm 302 is implemented in the passive safety system 80, utilizing pedestrian detection indications from the pedestrian detection algorithm 150, as discussed in more detail below. The PPS deployment algorithm 302 implements three subsystems, any of which can produce a PPS deployment command 300.

A normal acceleration subsystem 280 implements the one sensor detects, another sensor verifies configuration using the acceleration sensors PIS_LX 60 and PIS_RX 62. According to the PPS deployment algorithm 302, the normal acceleration subsystem 280 issues a PPS deployment command 300 in response to AND gate 282 being satisfied. AND gate 282 is satisfied in response to normal acceleration discrimination impact detected 266 and normal acceleration safing 274 (see FIG. 5). As shown above in Table 1, this can occur in Normal Acceleration Scenario 1, where PIS_LX 60 discriminates and PIS_RX 62 verifies, or vice versa, i.e., Normal Acceleration Scenario 2.

A normal pressure subsystem 296 implements the one sensor detects, another sensor verifies configuration using the pressure sensors PIS_LP 72 and PIS_RP 74. According to the PPS deployment algorithm 302, the normal pressure subsystem 296 issues a PPS deployment command 300 in response to AND gate 298 being satisfied. AND gate 298 is satisfied in response to normal pressure discrimination impact detected 268 and normal pressure safing 278 (see FIG. 5). As shown above in Table 1, this can occur in Normal Pressure Scenario 1, where PIS_LP 72 discriminates and PIS_RP 74 verifies, or vice versa, i.e., Normal Pressure Scenario 2.

A hybrid subsystem 284 also implements the one sensor detects, another sensor verifies configuration using the acceleration sensors PIS_LX 60, PIS_RX 62 and the pressure sensors PIS_LP 72 and PIS_RP 74. According to the PPS deployment algorithm 302, this subsystem 284 also implements the pedestrian detection flag 186 obtained from the pedestrian detection algorithm 150 (see FIG. 2). The hybrid subsystem issues a PPS deployment command 300 in response to any one or more of three scenarios indicated by AND gates 290, 292, 294.

Hybrid Acceleration Pedestrian Impact Detection

In one scenario, hybrid acceleration pedestrian impact detection is determined by the passive safety system 80 verified by the active safety system 100. According to this scenario, the hybrid subsystem implements the one sensor detects, another sensor verifies configuration using the acceleration sensors PIS_LX 60 and PIS_RX 62. This is shown at AND gates 286 and 290. According to this scenario, AND gate 286 is satisfied in response to hybrid acceleration discrimination impact detected 270 and hybrid acceleration safing 276 (see FIG. 5). As shown above in Table 1, this can occur in Hybrid Acceleration Scenario 1, where PIS_LX 60 discriminates and PIS_RX 62 verifies, or vice versa, i.e., Hybrid Acceleration Scenario 2.

AND gate 290 issues the PPS deployment command 300 in response to AND gate 286 indicating a hybrid acceleration pedestrian impact and the pedestrian detection flag 186 indicating the presence of a pedestrian in the vehicle path. In this manner, both the passive safety system 80 and the active safety system 100 are used for pedestrian impact detection and PPS deployment. Advantageously, the utilization of the active safety system to indicate that a pedestrian is detected in the vehicle path allows for the use of the hybrid discrimination metrics, which implement reduced magnitude acceleration thresholds for crash discrimination.

Hybrid Pressure Pedestrian Impact Detection

In another scenario, hybrid pressure pedestrian impact detection is determined by the passive safety system 80 verified by the active safety system 100. According to this scenario, the hybrid subsystem implements the one sensor detects, another sensor verifies configuration using the pressure sensors PIS_LP 72 and PIS_RP 74. This is shown at AND gates 288 and 294. According to this scenario, AND gate 288 is satisfied in response to hybrid pressure discrimination impact detected 272 and hybrid acceleration safing 280 (see FIG. 5). As shown above in Table 1, this can occur in Hybrid Pressure Scenario 1, where PIS_LP 72 discriminates and PIS_RP 74 verifies, or vice versa, i.e., Hybrid Pressure Scenario 2.

AND gate 294 issues the PPS deployment command 300 in response to AND gate 288 indicating a hybrid pressure pedestrian impact and the pedestrian detection flag 186 indicating the presence of a pedestrian in the vehicle path. In this manner, both the passive safety system 80 and the active safety system 100 are used for pedestrian impact detection and PPS deployment. Advantageously, the utilization of the active safety system to indicate that a pedestrian is detected in the vehicle path allows for the use of the hybrid discrimination metrics, which implement reduced magnitude pressure thresholds for crash discrimination.

Hybrid Acceleration and Pressure Pedestrian Impact Detection

In another scenario, hybrid pedestrian impact detection is determined and verified by the passive safety system 80 alone. According to this scenario, the hybrid subsystem implements and doubles up on the one sensor detects, another sensor verifies configuration using two acceleration sensors PIS_LX 60, PIS_RX 62 and the pressure sensors PIS_LP 272, PIS_RP 274. In this scenario, pedestrian impact detection is detected and verified by both acceleration and pressure sensors. This is shown at AND gate 292, which is satisfied when both AND gates 286 and 288 are satisfied.

AND gate 286 is satisfied in response to hybrid acceleration discrimination impact detected 270 and hybrid acceleration safing 276 (see FIG. 5). As shown above in Table 1, this can occur in Hybrid Acceleration Scenario 1, where PIS_LX 60 discriminates and PIS_RX 62 verifies, or vice versa, i.e., Hybrid Acceleration Scenario 2. AND gate 288 is satisfied in response to hybrid pressure discrimination impact detected 272 and hybrid pressure safing 280 (see FIG. 5). As shown above in Table 1, this can occur in Hybrid Pressure Scenario 1, where PIS_LP 72 discriminates and PIS_RP 74 verifies, or vice versa, i.e., Hybrid Pressure Scenario 2.

AND gate 292 issues the PPS deployment command 300 in response to both AND gate 286 indicating a hybrid acceleration pedestrian impact and AND gate 288 indicating a hybrid pressure pedestrian impact. In this manner, the passive safety system 80 alone is used for pedestrian impact detection and PPS deployment. Advantageously, the utilization of hybrid acceleration pedestrian impact detection and hybrid pressure pedestrian impact detection allows for the use of the hybrid discrimination metrics, which implement reduced magnitude acceleration thresholds for crash discrimination.

Passive Safety System Responsiveness

Figure 7:
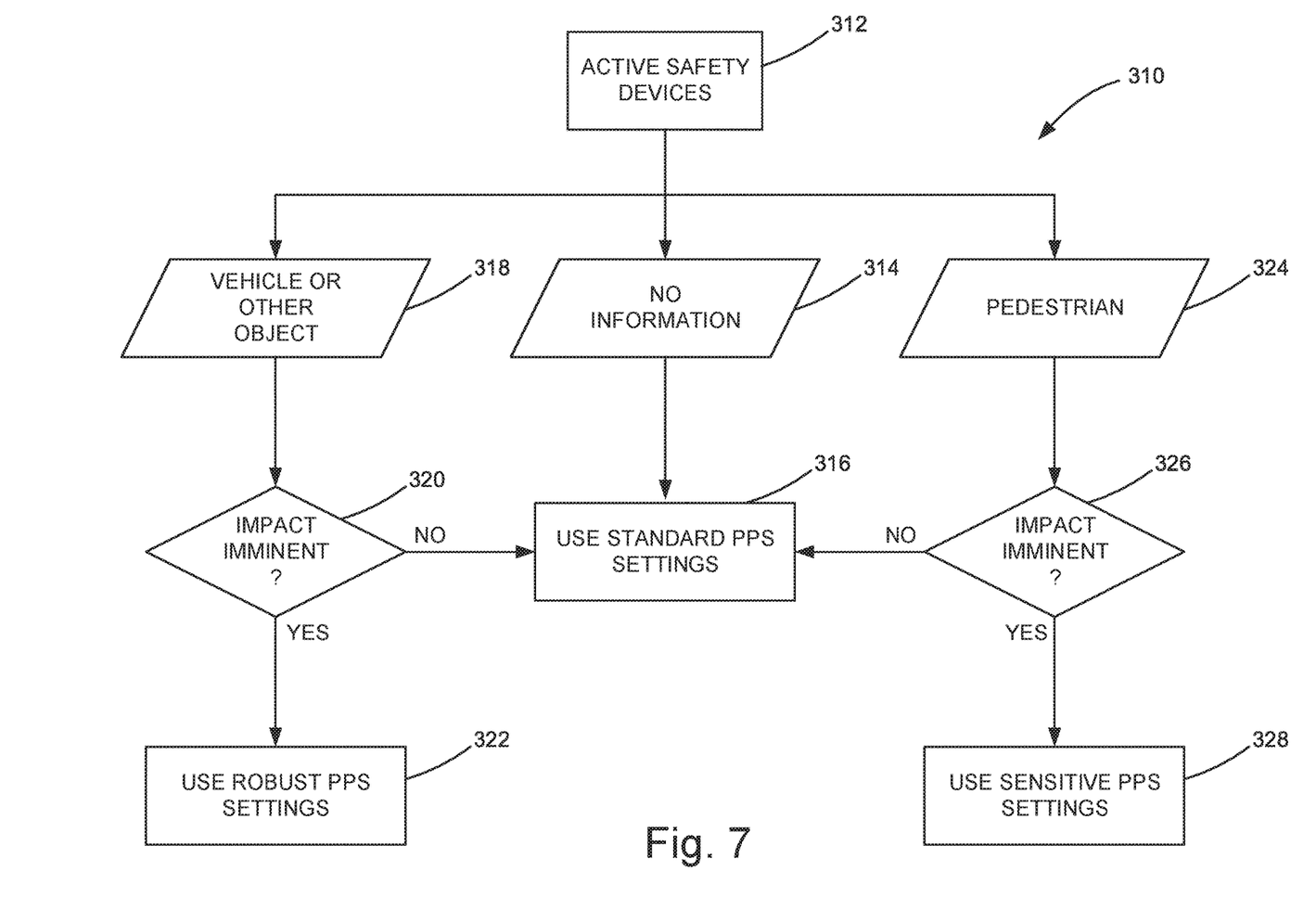
FIG. 7 is a schematic diagram illustrating functional logic utilizing the pedestrian and vehicle/object detection to enhance crash discrimination.

Utilizing information acquired from the active safety system 100 allows the vehicle safety system 10 to tune the PPS settings of the passive safety system 80 for standard, sensitive, and robust responsiveness. This is shown in FIG. 7. As shown in FIG. 7, a responsiveness algorithm 310 implemented by the vehicle safety system 10, i.e., the passive safety system 80, the active safety system 100, or both, determines how to tune the PPS settings in response to the indications from the active safety system 100.

Referring to FIG. 6, the standard PPS settings can be those of the acceleration normal subsystem 280, the pressure normal subsystem 296, and the hybrid acceleration and pressure pedestrian impact detection 284, but only the portion of that subsystem where hybrid pedestrian impact detection is determined and verified by the passive safety system 80 alone, i.e., AND gate 292. The robust PPS settings can be those of the acceleration normal subsystem 280 and the pressure normal subsystem 296. The sensitive settings can be those of the acceleration normal subsystem 280, the pressure normal subsystem 296, and the hybrid acceleration and pressure pedestrian impact detection 284.

As shown at block 312, information regarding object detection from the active safety system 100 is queried. As shown at block 314, if the active safety system 100 indicates no objects in the vehicle path or provides no information, the responsiveness algorithm 310 proceeds to block 316 and standard PPS settings are used.

As shown at block 318, if the active safety system 100 provides information that a vehicle or other object is detected in the vehicle path, the responsiveness algorithm 310 proceeds to block 320, where a determination is made as to whether an impact with the vehicle/other object is imminent. If an impact is imminent, the responsiveness algorithm 310 proceeds to step 322 and robust PPS settings are used. If an impact is not imminent, the responsiveness algorithm 310 proceeds to block 316 and standard PPS settings are used.

As shown at block 324, if the active safety system 100 provides information that a pedestrian is detected in the vehicle path, the responsiveness algorithm 310 proceeds to block 326, where a determination is made as to whether an impact with the pedestrian is imminent. If an impact is imminent, the responsiveness algorithm 310 proceeds to step 328 and sensitive settings are used. If an impact is not imminent, the responsiveness algorithm 310 proceeds to block 316 and standard PPS settings are used.

From the above description of the invention, those skilled in the art will perceive improvements, changes and modifications. Such improvements, changes, and/or modifications within the skill of the art are intended to be covered by the appended claims.

We claim:

1. A vehicle safety system for helping to protect a pedestrian in the event of a vehicle frontal collision with the pedestrian, comprising:
   a plurality of crash sensors for sensing a vehicle frontal collision;
   an actuatable pedestrian protection device;
   a controller for controlling actuation of the pedestrian protection device, the controller being operative to determine the occurrence of a collision with a pedestrian in response to signals received from the crash sensors; and
   at least one active sensor for determining the presence of a pedestrian in the path of the vehicle;
   wherein the controller is configured to determine the occurrence of a collision with a pedestrian using normal crash discrimination metrics implementing normal thresholds for determining whether signals received from the crash sensors indicate the occurrence of a collision with the pedestrian; and
   wherein, in response to determining the presence of a pedestrian in the path of the vehicle using the active sensor, the controller is configured to determine the occurrence of a collision with a pedestrian using hybrid crash discrimination metrics implementing hybrid thresholds, lower than the normal thresholds, for determining whether signals received from the crash sensors indicate the occurrence of a collision with the pedestrian.

2. The vehicle safety system recited in claim 1, wherein:
   the controller is configured to evaluate the normal crash discrimination metrics with a first crash sensor to determine the occurrence of a collision with the pedestrian and to evaluate normal safing metrics with a second crash sensor, different than the first crash sensor, to verify the determination of the first sensor; and
   the controller is configured to evaluate the hybrid crash discrimination metrics with a first crash sensor to determine the occurrence of a collision with the pedestrian and to evaluate hybrid safing metrics with a second crash sensor, different than the first crash sensor, to verify the determination of the first sensor.

3. The vehicle safety system recited in claim 2, wherein the first and second crash sensors comprise first and second accelerometers, and wherein:
   the normal and hybrid crash discrimination metrics comprise acceleration crash discrimination metrics that are evaluated to determine whether acceleration signals received from the first accelerometer exceed a predetermined discrimination threshold determined with respect to a high pass filtered (HPF) acceleration signal received from the first accelerometer;
   the normal and hybrid safing metrics comprise acceleration safing metrics that are evaluated to determine whether acceleration signals received from the second accelerometer exceed a predetermined safing threshold determined with respect to a high pass filtered (HPF) acceleration signal received from the second accelerometer.

4. The vehicle safety system recited in claim 2, wherein the first and second crash sensors comprise first and second pressure sensors of a pressure tube sensor, and wherein:
   the normal and hybrid crash discrimination metrics comprise pressure crash discrimination metrics that are evaluated to determine whether pressure signals received from the first pressure sensor exceed a predetermined discrimination threshold determined with respect to a high pass filtered (HPF) acceleration signal received from the first pressure sensor;
   the normal and hybrid safing metrics comprise pressure safing metrics that are evaluated to determine whether pressure signals received from the second pressure sensor exceed a predetermined safing threshold determined with respect to a high pass filtered (HPF) acceleration signal received from the first pressure sensor.

5. The vehicle safety system recited in claim 1, wherein the controller is configured to determine the occurrence of a collision with a pedestrian using at least one of:
   a normal acceleration crash discrimination metric that determines the occurrence of a collision with a pedestrian based on sensed acceleration values, and a normal acceleration safing metric that verifies the determination using sensed acceleration values different from those used by the normal acceleration crash discrimination metric;
   a hybrid acceleration crash discrimination metric that determines the occurrence of a collision with a pedestrian based on sensed acceleration values, and a hybrid acceleration safing metric that verifies the determination using sensed acceleration values different from those used by the normal acceleration crash discrimination metric;
   a normal pressure crash discrimination metric that determines the occurrence of a collision with a pedestrian based on sensed pressure values, and a normal pressure safing metric that verifies the determination using sensed pressure values different from those used by the normal pressure crash discrimination metric; and
   a hybrid pressure crash discrimination metric that determines the occurrence of a collision with a pedestrian based on sensed pressure values, and a hybrid pressure safing metric that verifies the determination using sensed pressure values different from those used by the normal pressure crash discrimination metric.

6. The vehicle safety system recited in claim 5, wherein the controller is configured to implement a robustness algorithm that determines, based on information from the active sensor, whether to implement a standard pedestrian protection scheme, a sensitive pedestrian protection scheme, and a robust pedestrian protection scheme.

7. The vehicle safety system recited in claim 6, wherein the robustness algorithm is configured to implement the standard pedestrian protection scheme in response to detecting via the active sensor any one of the following:
no information on the presence of a pedestrian in the path of the vehicle;
the presence of a pedestrian in the path of the vehicle and an impact with the pedestrian is not imminent; and
the presence of a vehicle/object other than a pedestrian in the path of the vehicle and an impact with the vehicle/object is not imminent.

8. The vehicle safety system recited in claim 7, wherein in response to implementing the standard pedestrian protection scheme, the controller is configured to deploy the pedestrian protection device in response to at least one of:
the normal acceleration crash discrimination metric determines the occurrence of a collision with a pedestrian and the normal acceleration safing metric verifies the collision;
the normal pressure crash discrimination metric determines the occurrence of a collision with a pedestrian and the normal pressure safing metric verifies the collision; and
the hybrid acceleration crash discrimination metric determines the occurrence of a collision with a pedestrian, the hybrid acceleration safing metric verifies the collision, the hybrid pressure crash discrimination metric determines the occurrence of a collision with a pedestrian, and the hybrid pressure safing metric verifies the collision.

9. The vehicle safety system recited in claim 6, wherein the robustness algorithm is configured to implement a sensitive pedestrian protection scheme in response to detecting via the active sensor the presence of a pedestrian in the path of the vehicle and that an impact with the pedestrian is imminent.

10. The vehicle safety system recited in claim 9, wherein in response to implementing the sensitive pedestrian protection scheme, the controller is configured to deploy the pedestrian protection device in response to at least one of:
the normal acceleration crash discrimination metric determines the occurrence of a collision with a pedestrian and the normal acceleration safing metric verifies the collision;
the normal pressure crash discrimination metric determines the occurrence of a collision with a pedestrian and the normal pressure safing metric verifies the collision;
the hybrid acceleration crash discrimination metric determines the occurrence of a collision with a pedestrian, the hybrid acceleration safing metric verifies the collision; and
the hybrid pressure crash discrimination metric determines the occurrence of a collision with a pedestrian, the hybrid pressure safing metric verifies the collision.

11. The vehicle safety system recited in claim 6, wherein the robustness algorithm is configured to implement a robust pedestrian protection scheme in response to detecting via the active sensor the presence of a vehicle/object other than a pedestrian in the path of the vehicle and that an impact with the vehicle/object is imminent.

12. The vehicle safety system recited in claim 11, wherein in response to implementing the robust pedestrian protection scheme, the controller is configured to deploy the pedestrian protection device in response to at least one of:
the normal acceleration crash discrimination metric determines the occurrence of a collision with a pedestrian and the normal acceleration safing metric verifies the collision; and
the normal pressure crash discrimination metric determines the occurrence of a collision with a pedestrian and the normal pressure safing metric verifies the collision.

13. The vehicle safety system recited in claim 1, wherein the controller is configured to determine via the active sensor:
a type of the object in the vehicle path;
a lateral position of the object relative to the vehicle path;
a time to collision (TTC) of the object in the vehicle path;
a relative velocity of the object and the vehicle;
a longitudinal position of the object relative to the vehicle; and
a vehicle speed of the vehicle.

14. The vehicle safety system recited in claim 13, wherein the controller is configured to implement an algorithm for detecting the presence of an object in the path of the vehicle by:
determining whether the type of the object in the vehicle path is a pedestrian or another vehicle/object;
determining whether the lateral position of the object is within a threshold range of lateral position values;
determining whether the TTC with the object is within a threshold indicative of an impending collision;
determining whether longitudinal position of the object is within a threshold indicative of an impending collision;
determining whether the vehicle speed is within a threshold range of vehicle speed values a speed of the vehicle.

15. The vehicle safety system recited in claim 14, wherein the controller is configured to evaluate a TTC collision discrimination metric to determine whether the TTC exceeds a predetermined threshold indicative of an impending collision, wherein the threshold is determined with respect to the relative velocity of the object and the vehicle.

16. The vehicle safety system recited in claim 14, wherein the controller is configured to evaluate a longitudinal distance collision discrimination metric to determine whether the longitudinal distance between the object and the vehicle exceeds a predetermined threshold indicative of an impending collision, wherein the threshold is determined with respect to the relative velocity of the object and the vehicle.

17. The vehicle safety system recited in claim 1, wherein the controller is configured to implement an algorithm for determining the presence of a pedestrian in the path of the vehicle by:
determining a time to collision (TTC) with the of the pedestrian in the vehicle path and a relative velocity of the pedestrian and the vehicle; and
determining whether the TTC with the pedestrian is within a threshold indicative of an impending collision by evaluating a TTC collision discrimination metric to determine whether the TTC exceeds a predetermined threshold, the threshold being determined with respect to the relative velocity of the pedestrian and the vehicle.

18. The vehicle safety system recited in claim 1, wherein the controller is configured to implement an algorithm for determining the presence of a pedestrian in the path of the vehicle by:
determining a longitudinal position of the pedestrian relative to the vehicle, and a relative velocity of the pedestrian and the vehicle; and determining whether the longitudinal position of the pedestrian relative to the vehicle is within a threshold indicative of an impending collision by evaluating a longitudinal distance collision discrimination metric to determine whether the longitudinal distance between the pedestrian and the vehicle exceeds a predetermined threshold, the threshold being determined with respect to the relative velocity of the pedestrian and the vehicle.

19. The vehicle safety system recited in claim 1, wherein the at least one active sensor comprises at least one of a camera, a radar sensor, and a laser radar (LIDAR) sensor.

20. The vehicle safety system recited in claim 1, wherein the vehicle safety system comprises an active safety system, and wherein the active sensor is a component of the active safety system.

21. The vehicle safety system recited in claim 20, wherein the active safety system is configured to perform driver assist functions comprising at least one of active cruise control functions, lane departure functions, blind spot monitoring functions, parking assist functions, automated driving functions.

22. The vehicle safety system recited in claim 21, wherein the active safety system comprises a DAS controller for controlling the driver assist functions, wherein the DAS controller is configured to communicate with the passive safety system controller.

23. The vehicle safety system recited in claim 22, wherein the vehicle safety system comprises a passive safety system comprising the crash sensors, the pedestrian protection device, and the controller, wherein the controller comprises an airbag controller unit (ACU).

24. The vehicle safety system recited in claim 1, wherein the pedestrian protection device comprises at least one of a hood lifter and a pedestrian airbag.

* * * * *